US010172057B2

(12) United States Patent
Keller et al.

(10) Patent No.: US 10,172,057 B2
(45) Date of Patent: Jan. 1, 2019

(54) HANDLING OF RADIO ACCESS NETWORK RE-SELECTION

(71) Applicant: Telefonaktiebolaget LM Ericsson (publ), Stockholm (SE)

(72) Inventors: Ralf Keller, Würselen (DE); Peter Hedman, Helsingborg (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 76 days.

(21) Appl. No.: 15/111,193

(22) PCT Filed: Jan. 15, 2014

(86) PCT No.: PCT/EP2014/050698
§ 371 (c)(1),
(2) Date: Jul. 13, 2016

(87) PCT Pub. No.: WO2015/106809
PCT Pub. Date: Jul. 23, 2015

(65) Prior Publication Data
US 2016/0330666 A1 Nov. 10, 2016

(51) Int. Cl.
*H04W 36/14* (2009.01)
*H04W 48/18* (2009.01)
(Continued)

(52) U.S. Cl.
CPC ............ *H04W 36/14* (2013.01); *H04W 36/24* (2013.01); *H04W 36/36* (2013.01); *H04W 48/18* (2013.01); *H04W 76/30* (2018.02); *H04W 48/20* (2013.01)

(58) Field of Classification Search
CPC ..... H04W 36/14; H04W 36/24; H04W 36/36; H04W 48/18; H04W 76/06; H04J 11/0079
See application file for complete search history.

(56) References Cited

U.S. PATENT DOCUMENTS 8,917,702 B2 * 12/2014 Wegmann ......... H04W 36/0083
370/331
9,635,705 B2 * 4/2017 Lu ......................... H04W 84/00
(Continued)

FOREIGN PATENT DOCUMENTS

| WO | 2009121745 A1 | 10/2009 |
| WO | 2011000672 A1 | 1/2011 |
| WO | 2011096870 A1 | 8/2011 |

*Primary Examiner* — Wei Zhao
(74) *Attorney, Agent, or Firm* — Murphy, Bilak & Homiller, PLLC

(57) ABSTRACT

A system, method, node and computer program for handling re-selection of a RAN (120, 130, 140) by a UE (100) is described. The UE (100) is attached via a first RAN (120, 130) to a CS control node (110) for execution of a CS service. The method comprises that the CS control node (110) receives an indication that the execution of the CS service shall be terminated. The CS control node (110) then determines whether the UE (100) shall perform re-selection of the RAN (120, 130, 140). If so, the CS control node (110) determines selection criteria for the re-selection of the RAN (120, 130, 140) and sends them to the UE (100) using Non-Access Stratum related signaling. The UE (100) receives the determined selection criteria from the CS control node (110) and re-selects the RAN (120, 130, 140), considering the received selection criteria.

20 Claims, 4 Drawing Sheets

(51) Int. Cl.
*H04W 36/24* (2009.01)
*H04W 36/36* (2009.01)
*H04W 76/30* (2018.01)
*H04W 48/20* (2009.01)

(56) References Cited

U.S. PATENT DOCUMENTS

| | | |
|---|---|---|
| 2009/0238143 A1 | 9/2009 | Mukherjee et al. |
| 2013/0070728 A1 | 3/2013 | Umatt et al. |
| 2015/0127733 A1* | 5/2015 | Ding ........................ H04W 4/08 709/204 |

\* cited by examiner

HANDLING OF RADIO ACCESS NETWORK RE-SELECTION

TECHNICAL FIELD

The present invention relates to telecommunications and in particular to a system, method, node and computer program for handling of re-selection of a radio access network by a user equipment.

BACKGROUND

Existing cellular network deployments are dominated by the 2G and 3G Third Generation Partnership Project (3GPP) standards. The process of rolling out so-called 4G networks has just begun, and it will be many years before 4G network coverage is sufficient to allow 2G and 3G networks to be withdrawn completely, if at all. A fundamental requirement for real-time service provision is the seamless handover of services for subscribers roaming across cell boundaries of the radio access network (RAN). Given the ongoing co-existence of 2G, 3G and 4G networks, it is particularly desirable to allow for the handover of real-time service connections such as circuit switched (CS) services between the different radio access technologies.

Considering further the 4G technology, this is being specified under the name LTE Long Term Evolution (LTE) and System Architecture Evolution (SAE) in 3GPP. The LTE RAN technology implements only a packet switched (PS) access, in contrast to 2G/3G, using GSM/EDGE Radio Access Network (GERAN) and Universal Terrestrial Radio Access Network (UTRAN) technologies respectively, which provide for both PS and CS access. In 2G and 3G networks PS connections are used to carry data traffic, whilst CS connections are used for real-time services such as voice or video. The target is that in 4G networks all services will be carried over PS connections.

However, during the roll-out phase of LTE RAN there will be cases that the LTE RAN or the user equipment (UE) are not yet capable of handling a voice call over PS connections. In this case the UE has to fallback to a corresponding CS service using 2G/3G via GERAN and UTRAN, if the user wants to initiate a voice call or wants to receive a voice call. This fallback is defined in 3GPP as CS-fallback (CSFB) and is defined in 3GPP TS 23.272 "Circuit Switched (CS) fallback in Evolved Packet System (EPS) Stage 2".

Even if the UE and the LTE RAN is capable of handling a voice call over PS connections, due to the spotty LTE radio coverage during the roll-out phase of LTE RAN, the UE may move out of LTE RAN coverage. In this case it is necessary for the call to be transferred to a 2G or 3G radio access network, i.e. the call must be handed over from a PS access to a CS access.

In case a voice call is established using a PS access, the IP Multimedia Subsystem (IMS) network defined by 3GPP provides IP Multimedia services over mobile communication networks, which provides a common service control network for the PS and CS domains provided through the LTE, UTRAN, or GERAN radio accesses. In order to implement the access handover, media control must be transferred from the Evolved Packet Core (EPC) network of the 4G domain to an allocated Mobile Switching Centre (MSC) within the 2G/3G domain.

Interworking solutions for IMS Centralized Services (ICS) as specified in 3GPP TS 23.292, "IP Multimedia Subsystem (IMS) centralized services Stage 2", allow IMS sessions using CS bearers to be treated as standard IMS sessions, which is required for the purpose of IMS Service Continuity. ICS defines signaling mechanisms between the UE and IMS for transport of information to centralize the service in the IMS, and TS 23.237 "IP Multimedia Subsystem (IMS) Service Continuity" defines the additional procedures needed for service continuity when using CS access for media transport. Within the context of TS 23.292 and TS 23.237, the further 3GPP document TS 23.216: "Single Radio Voice Call Continuity (SRVCC); Stage 2", describes a mechanism for handing over a voice call from a PS to a CS access.

Consequently, there are cases where a UE is leaving the LTE RAN and is using 2G/3G RAN for the execution of a CS service. When the execution of the CS service has ended, the UE is still attached to the MSC via the 2G/3G RAN. However, 2G/3G RAN may not be a RAN preferred by the subscriber using the UE, as the data rates of the 2G/3G RAN may be limited. So it would be beneficial if the UE would return as quickly as possible to a preferred RAN after the CS service has terminated. The preferred network could be any kind of network which is preferred in the subscription of the subscriber using the UE, or is preferred by the operator of the communication network. As an example, LTE or any other high speed packet access (HSPA) network could be the preferred network for a UE.

Even without SRVCC there is need for a UE to move to its preferred network as soon as possible after the CS service has ended. An UE that starts a call using CS access (e.g. due to bad LTE coverage) and then moves into an area with good LTE coverage would benefit from moving as fast as possible to LTE after the provisioning of a CS service has been completed.

The 3GPP standards for SRVCC and CSFB describe some solutions for how to perform a fast return to LTE after CSFB or SRVCC respectively. However, these solutions imply changes in the implementation of the RAN, which is very difficult for an operator to deploy in practice. In a typical network there may be thousands of RAN nodes that would need to be upgraded, which is not feasible on top of the ongoing LTE RAN rollout. Other solutions are tailor-made for a specific UE radio chipset of a single vendor, and this solution then lacks support in UEs not being based on this particular radio chipset. These known solutions for fast return to LTE are also limited to a single LTE frequency as selection criteria.

SUMMARY

There is a clear need for an improved re-selection mechanism of a RAN by a UE, eliminating impacts on the RAN and not being limited to certain UE hardware or RAN selection criteria.

It is an object of the present invention to improve the re-selection mechanism of a RAN by a UE. This object is achieved by the independent claims. Advantageous embodiments are described in the dependent claims.

According to an exemplary aspect of the invention, a method for re-selection of a RAN by a UE is provided. The UE is attached via a first RAN to a CS control node for execution of a CS service. The method comprises the CS control node receiving an indication that the execution of the CS service shall be terminated. The method also comprises the CS control node determining whether the UE shall perform re-selection of the RAN. If the UE shall perform re-selection of the RAN, the CS control node determines selection criteria for the re-selection of the RAN. The method further comprises the CS control node sending the determined selection criteria to the UE. The method further comprises the UE receiving the determined selection criteria from the CS control node. The method also comprises the UE re-selecting the RAN, wherein the re-selection is considering the received selection criteria.

The method may further comprise, that the sending of the determined selection criteria to the UE utilizes signaling messages related to the termination of the CS service.

According to another exemplary aspect of the invention, a method in a CS control node for re-selection of a RAN by a UE is provided. The UE is attached via a first RAN to the CS control node for execution of a CS service. The method comprises receiving an indication that the execution of the CS service shall be terminated. The method also comprises determining whether the UE shall perform re-selection of the RAN. If the UE shall perform re-selection of the RAN, the CS control node determines selection criteria for the re-selection of the RAN. The method also comprises sending the determined selection criteria to the UE.

According to another exemplary aspect of the invention, a method in a UE for re-selection of a RAN is provided. The UE is attached via a first RAN to a CS control node for execution of a CS service. The method comprises receiving an indication that the execution of the CS service shall be terminated. The method further comprises receiving selection criteria for the re-selection of the RAN from the CS control node. The method also comprises re-selecting the RAN, wherein the re-selection is considering the received selection criteria.

According to another exemplary aspect of the invention, a CS control node for re-selection of a RAN, by a UE, is provided. The UE is attached via a first RAN to the CS control node for execution of a CS service. The CS control node is capable of receiving an indication that the execution of the CS service shall be terminated. The CS control node is further capable of determining, whether the UE shall perform re-selection of the RAN. If the UE shall perform re-selection of the RAN, the CS control node is determining a selection criteria for the re-selection of the RAN. The CS control node is further capable of sending the selection criteria to the UE.

According to another exemplary aspect of the invention, a UE, for re-selection of a RAN is provided. The UE is attached via a first RAN to a CS control node for execution of a CS service. The UE is capable of receiving an indication that the execution of the CS service shall be terminated. The UE is also capable of receiving a selection criteria for the re-selection of the RAN. The UE is furthermore capable of re-selecting the RAN, wherein the re-selection is considering the received selection criteria.

According to another exemplary aspect of the invention, a system for re-selection of a RAN by a UE is provided. The UE is attached via a first RAN to a CS control node for execution of a CS service. The system comprises the CS control node, the UE, the first RAN, and a further RAN.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
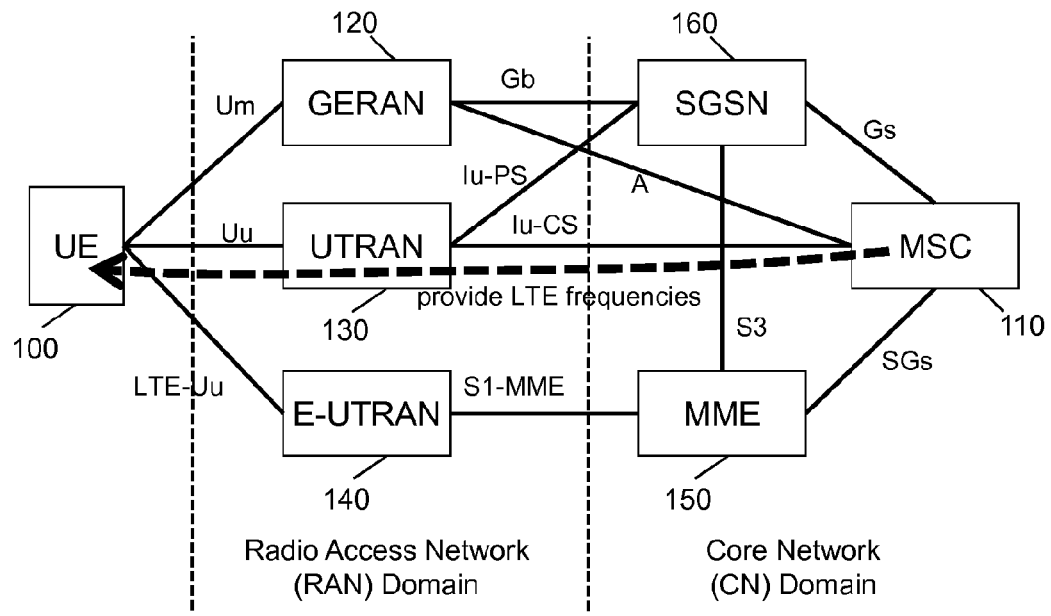
FIG. 1 shows a diagram illustrating a system for handling of re-selection of a RAN by a UE according to the invention.

In the following, a system, methods, nodes, and computer programs for handling of re-selection of a RAN by a UE according to the invention are described in more detail.

Within the context of the present application, the term "user equipment" (UE) refers to a device for instance used by a person for his or her personal communication. It can be a telephone type of device, for example a telephone or a SIP phone, cellular telephone, a mobile station, cordless phone, or a personal digital assistant type of device like laptop, notebook, notepad equipped with a wireless data connection. The UE may also be associated with non-humans like animals, plants, or even machines. A UE may be equipped with a SIM (Subscriber Identity Module) comprising unique identities such as IMSI (International Mobile Subscriber Identity) and/or TMSI (Temporary Mobile Subscriber Identity) associated with a subscriber using the UE. The presence of a SIM within a UE customizes the UE uniquely with a subscription of the subscriber.

Within the context of the present application, the term "communication network" or short "network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as 2G, GSM, 3G, WCDMA, CDMA, LTE, WLAN, Wi-Fi), mobile backhaul network, or core network such as IMS, CS Core, PS Core.

Within the context of the present application, the term "control node" refers to a node of the communication network primarily performing control procedures for sessions or calls and services of a subscriber of the communication network. The term typically refers to those entities of the communication network handling control plane, subscriber data, services, or signaling traffic associated with user traffic in the communication network. In a core network a control node may be a MSC, MME (Mobility Management Entity), SGSN (Serving Gateway Support Node), P-CSCF (Proxy Call State Control Function), S-CSCF (Serving-CSCF), or TAS (Telephony Application Server) node. Within the context of the present application, the term "CS control node" refers to a control node of the circuit switched communication network, for example a MSC. The MSC may be combined with a Visited Location Register (VLR) and be therefore also called MSC/VLR. The MSC node may also be enabled to control a remote Media Gateway (MGW) and therefore act as a server and may therefore be also called MSC Server or short MSC-S. Within the context of the present application MSC, MSC/VLR and MSC-S are functional equivalent.

Within the context of the present application, the term "CS service" refers to a service offered to a subscriber by the communication network operator. In particular the CS service is a service handled by a CS control node and may be any one of a call request, a short message request, a location request, or an unstructured supplementary service request.

Within the context of the present application, the term "selection criteria" refers to parameters characterizing a RAN technology. Selection criteria allow a UE to select a certain RAN such as GSM, WCDMA, CDMA, LTE, WLAN for attachment. The selection criteria may furthermore be of such detail, that the UE may select certain radio parameter within a particular RAN technology. Examples of selection criteria may be a RAN frequency, a RAN technology, a RAN target cell, a RAN modulation, a RAN timeslot, a RAN multiplexing code, or any other RAN characterizing parameter.

Referring to FIG. 1, this figure shows a diagram illustrating a system for handling of re-selection of a RAN by a UE according to the invention.

A UE 100 is connected via a RAN Domain to a Core Network (CN) Domain. The CN Domain comprises control nodes such as MME 150, SGSN 160, or MSC 110. The MSC 110 is interconnected with the SGSN 160 via a so called Gs-interface, and via a SGs-interface with the MME 150. The MME 150 is interconnected with the SGSN 160 via a S3-interface.

The CN Domain control nodes MME 150, SGSN 160, and MSC 110 are interconnected to RAN Domain RANs, comprising GERAN 120, UTRAN 130, and E-UTRAN 140. While the MSC 110 is connected via A-interface to the GERAN 120 and via Iu-CS interface to the UTRAN 130, the SGSN 160 is connected via Gb-interface to the GERAN 120 and via Iu-PS interface to the UTRAN 130. The MME is connected via S1-MME interface to the E-UTRAN 140.

The UE 100 connects to the RAN Domain comprising GERAN 120, UTRAN 130, and E-UTRAN 140. The UE 100 may connect to the E-UTRAN 140 via a LTE-Uu interface, via a Uu-interface to the UTRAN 130, or via a Um-interface to the GERAN 120.

For provisioning of PS-services, the UE 100 may connect via E-UTRAN 140 to the MME 150. By alternative, the UE 100 may connect via UTRAN 130 or GERAN 120 to the SGSN 160 for the provisioning of PS-services. For provisioning of CS-services, the UE 100 may connect via UTRAN 130 or GERAN 120 to the MSC 110.

For execution of a CS service such as a voice call, the UE 100 is attached for example via the UTRAN 130 to the MSC 110. For control of the voice call, the UE 100 and the MSC 110 exchange call control signaling via a non-access stratum (NAS) protocol layer. The protocol architecture for communication between a UE 100 and a core network node 110, 150, 160, is further described in more detail in FIG. 2.

In order that the UE 100 can re-select the RAN 120, 130, 140 when the execution of a CS service has ended, the UE 100 may receive RAN selection criteria. These RAN selection criteria can guide the UE 100 to connect to any of the RANs of the RAN Domain, comprising for example GERAN 120, UTRAN 130, and E-UTRAN 140.

For example, the CS service is a voice call and the UE 100 is attached for example via the UTRAN 130 to the MSC 110. Here the MSC 110 corresponds to a CS control node. The MSC 110 may receive an indication that the execution of the CS service shall be terminated. This indication may be received by the MSC 110 via NAS call control signaling from the UE 100, or the MSC 110 may receive this indication from other nodes of the communication network, or also from a remote UE indicating the release of voice call to the MSC 110 via the communication network.

When the MSC 110 has received the indication that the execution of the CS service shall be terminated, the MSC 110 determines whether the UE 100 shall perform re-selection of the RAN 120, 130, 140. This decision may be based on whether a subscriber using the UE 100 has a subscription to use a further RAN 120, 130, 140. The VLR integrated in the MSC comprises subscriber data which may indicate this.

The selection of the RAN 120, 130, 140 may by alternative or in addition be based on whether the UE 100 supports a further RAN 120, 130, 140. The MSC 110 may derive this information from the fact that a SGs-interface is set-up between the MSC 110 and the MME 150 for the UE 100, or the UE 100 provides a "CS fallback mobile terminating call" (CSMT) or a "CS fallback mobile originating call" (CSMO) flag (as defined in 3GPP TS 24.008) to the MSC 110 as part of an "additional update parameters" information element in a location update request or a Connection Management Service Request, before making a CS call after the UE 100 has performed CSFB. For SRVCC, the MSC 110 may receive from the MME 150 via a Sv-interface a "SRVCC PS to CS Request" (as defined in 3GPP TS 23.216) and thereby the MSC 110 knows that the UE 100 is LTE capable and the subscriber has a LTE subscription.

The decision may by alternative or in addition be based on whether the MSC 110 has selection criteria configured. The operator of the MSC 110 may have configured the selection criteria with the help of operation and maintenance means. By this the selection criteria may also reflect an operator preference.

If the UE 100 shall perform re-selection of the RAN 120, 130, 140, the MSC 110 determines selection criteria for the re-selection of the RAN 120, 130, 140. The selection criteria may be a list of criteria in order of preference. The MSC 110 may determine the selection criteria in relation to whether the UE 100 is a roaming-in subscriber, so coming into the communication network from a further network. In this case the determined selection criteria may for example be that roaming-in subscribers are directed to a certain LTE frequency, while all own subscribers are directed to a different LTE frequency.

The MSC 110 may also or by alternative consider whether a fallback (CSFB) to the currently used RAN, e.g. UTRAN 130, has been performed for the establishment of the ongoing CS service. The MSC 110 may also or by alternative consider whether a SRVCC handover has been performed before for the voice call, which then resulted into the ongoing CS service. In these cases the determined selection criteria may for example be that if CSFB or SRVCC has been performed, the UE 100 shall return to LTE, while if no CSFB or SRVCC has been performed the UE 100 may stay in the current RAN 120, 130.

A type of CS service or a geographical location of the UE 100 may also be considered by the MSC 110. In this case the determined selection criteria may for example be that the UE is directed to a certain LTE frequency supported by the RAN 140 in that geographical location. Or that after SMS CS services the UE 100 shall stay in the current RAN 120, 130, while after voice call CS services the UE 100 shall change to RAN 140.

When the MSC 110 has determined the selection criteria for the re-selection of the RAN 120, 130, 140, the MSC 110 sends the determined selection criteria to the UE 100. This sending of the determined selection criteria to the UE 100 may utilize signaling messages related to the termination of the CS service. So the MSC 110 may utilize NAS signaling messages for the delivery of the determined selection criteria to the UE 100, wherein the signaling messages may be related to the termination of the CS service or may also be sent before the termination of the CS service is initiated, so independent of the termination of the CS service, so during the ongoing CS service.

The selection criteria may be any one of a RAN frequency, a RAN technology, or a RAN target cell. So for example the UE 100 may be attached via GERAN 120 or UTRAN 130 to the MSC 110 and the determined selection criteria indicate that the UE shall select a LTE RAN 140.

The UE 100 receives the selection criteria determined by the MSC 110. The UE 100 may receive them via NAS signaling. The UE 100 then considers the received selection criteria in the RAN re-selection process. The UE 100 may decide whether and which RAN to connect to, based on the RAN selection criteria.

The UE 100 may also indicate to the MSC 110, that the UE 100 supports RAN re-selection and/or that the UE is capable to receive RAN selection criteria from the MSC 110, for example by providing a corresponding indication in a mobility message sent to the MSC 110.

Figure 2:
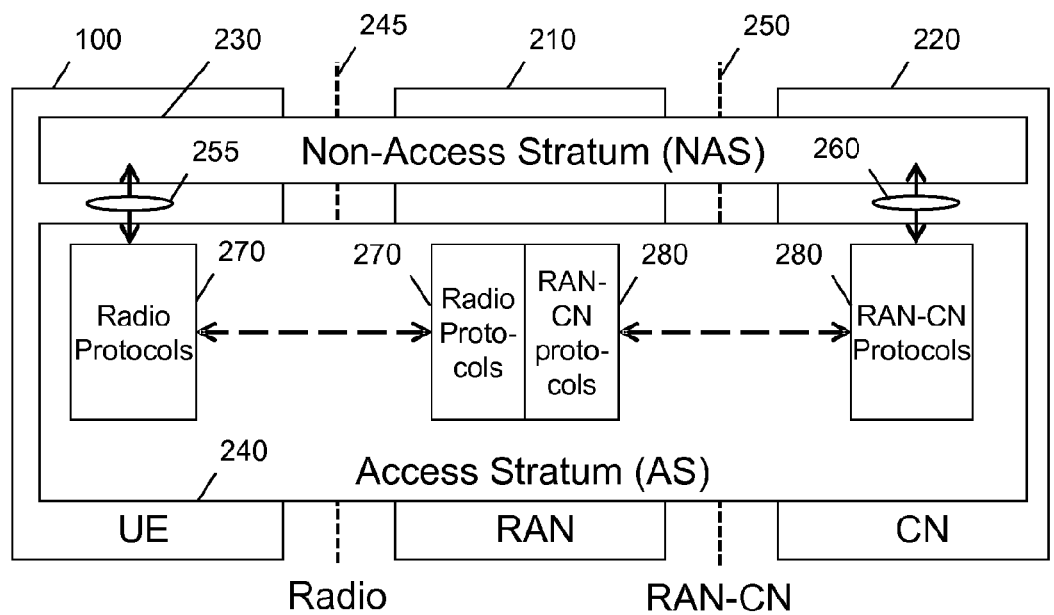
FIG. 2 shows an illustration of a protocol architecture for communication between a UE and a core network according to prior art.

In addition to the MSC 110 providing selection criteria to the UE via NAS signaling, also the currently serving RAN 120, 130 may provide RAN selection criteria to the UE 100 via an Access Stratum (AS) signaling (see description of FIG. 2). So if the UE 100 has received RAN selection criteria from the currently serving RAN 120, 130, the UE may give priority to the RAN selection criteria received from the currently serving RAN 120, 130 and may ignore the RAN selection criteria received from the MSC 110. On the other hand, if the UE 100 has received RAN selection criteria from the MSC 110 and the UE 100 has not received any selection criteria from the currently serving RAN 120, 130, the UE 100 may base the re-selection of the RAN 120, 130, 140 on the selection criteria received from the MSC 110.

If the UE 100 has not received any selection criteria from the currently serving RAN 120, 130, and the selection criteria received from the MSC 110 are supported by the UE 100, the UE 100 uses the selection criteria received from the MSC 110 for the re-selection of the RAN 120, 130, 140.

Referring to FIG. 2, this figure shows an illustration of a protocol architecture for communication between a UE and a core network node according to prior art.

A UE 100 is connected via a RAN 210 to a CN 220, and in particular to a CN node such as the MSC 110. Hereby the UE 100 is connected to the RAN 210 via a radio interface 245, while the RAN 210 and the CN 220 are connected via a RAN-CN interface 250.

The radio interface 245 may be any of an Um, Uu, or LTE-Uu interfaces of FIG. 1. The RAN-CN interface 250 may be any of an A, Gb, Iu-PS, Iu-CS, or S1-MME interfaces of FIG. 1. So RAN 210 corresponds to any of GERAN 120, UTRAN 130, and E-UTRAN 140 of FIG. 1.

The UE 100 and the CN 220 are communicating via Non-Access Stratum (NAS) plane 230, which is logically transported directly between the UE 100 and the CN 220.

From a protocol stack perspective, the NAS 230 is the highest stratum of the control plane between the UE 100 and the CN 220.

The logically direct connection between the UE 100 and the CN 220 is realized by cascading radio protocols 270 and RAN-CN protocols 280 of the Access Stratum (AS) 240 plane. The NAS plane 230 accesses the AS plane 240 via Application Programming Interfaces (API) 255 on the UE 100 side and 260 on the CN side. So the NAS plane 230 makes use of the transport capabilities of the AS plane 240 via APIs.

Signaling messages exchanged via NAS plane 230 between the UE 100 and the CN 220 are totally transparent for the AS plane 240 protocols. By this it is ensured that any changes or additions to the NAS plane 230 signaling messages have no impact on the RAN 210 implementation.

By providing RAN selection criteria to the UE 100 via NAS 230 signaling, the MSC 110 can guide the UE 100 on the RAN selection without any impacts on the RAN 120, 130, 140.

The UE 100 NAS layer receives the RAN selection criteria (for example a list of LTE RAN frequencies), passes them to the UE 100 AS layer, which then uses them when re-selecting the RAN when the CS service has ended. This RAN selection criteria may override (or be given higher priority compared to) any information locally stored in the UE 100. However, the UE 100 may still prioritize RAN selection criteria if received from a RAN 210 node via a radio protocol 270.

Figure 3:
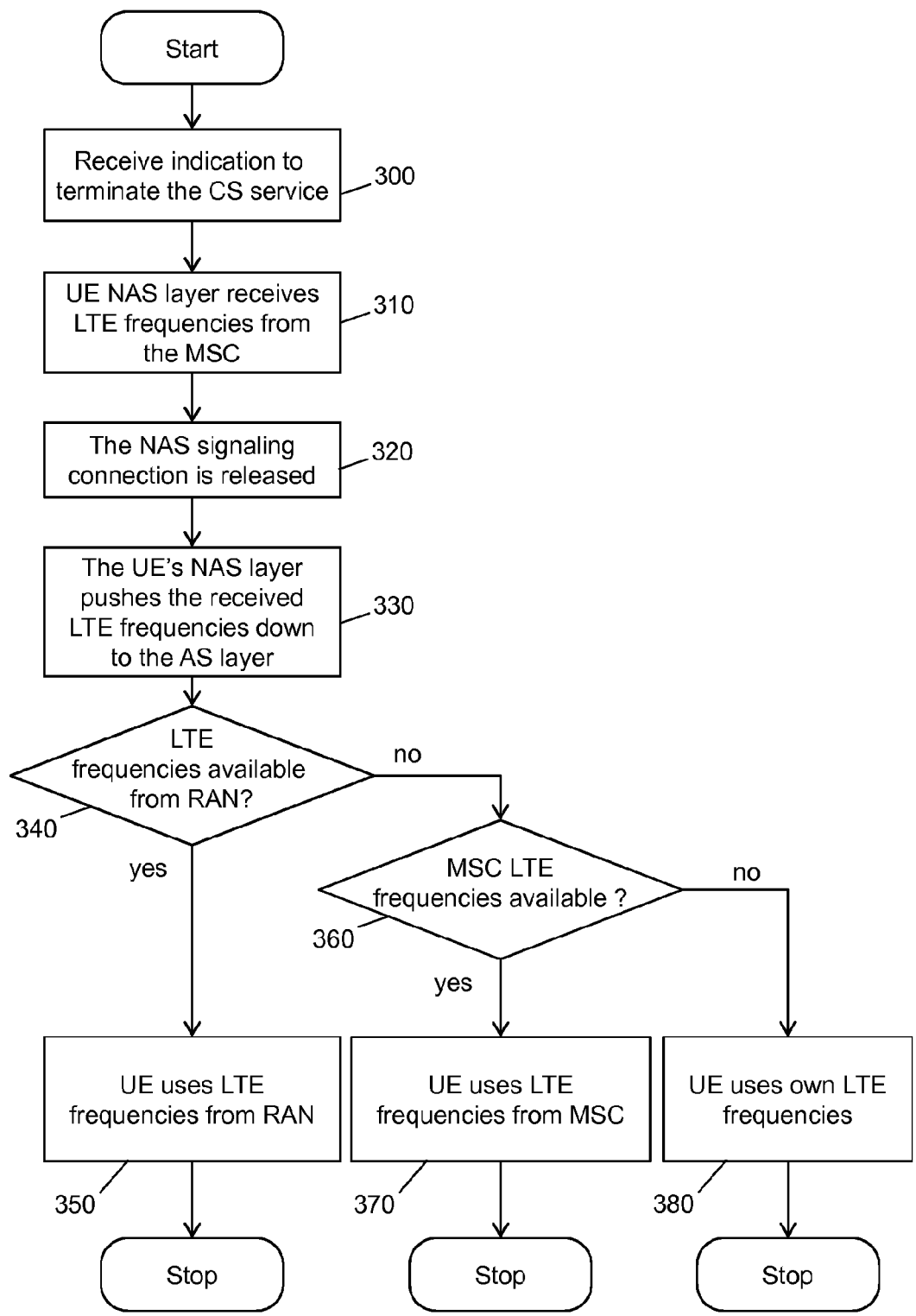
FIG. 3 shows a flow diagram in a UE for handling of re-selection of RAN by a UE according to the invention.

Referring to FIG. 3, this figure shows a flow diagram in a UE 100 for handling of re-selection of RAN by a UE 100 according to the invention.

The UE 100 is attached via a first RAN 120 or 130 to a MSC 110 for execution of a CS service, and the execution of the CS service is ongoing.

The flow starts by the UE 100 receiving 300 an indication to terminate the ongoing CS service. This indication may be received via NAS signaling from the MSC 110, or the UE 100 may receive this indication from the subscriber using the UE 100, for example via a keypad or touchscreen interface.

If the indication is received from the subscriber using the UE 100, the UE 100 informs the MSC 110 about the CS service termination indication (not depicted).

In step 310 the UE 100 receives RAN re-selection criteria from the MSC 110. In this example the RAN selection criteria correspond to LTE frequencies, and these are received from the MSC 110 via NAS signaling, for example as part of the signaling related to the termination of the CS service.

In step 320 the CS service has been terminated and the related NAS signaling between the UE 100 and the MSC 110 is released.

In step 330 the UE's NAS layer pushes the received LTE frequencies down to the AS layer, for example by using the API 255 shown in FIG. 2.

As a next step, the UE 100 has to perform RAN re-selection, which is done by performing the checks 340 and 360.

In step 340 the UE 100 checks if LTE frequencies have been received from the serving RAN via radio protocols. If the answer is yes, so if LTE frequencies have been received from the serving RAN, the execution continues with step 350.

In step 350 the UE 100 uses the LTE frequencies from the serving RAN, so the re-selection of the RAN is based on preferences of the serving RAN. Then the flow stops.

If in step 340 no LTE frequencies have been received from the serving RAN via radio protocols, so the answer is no, the execution continues with step 360.

In step 360 the UE 100 checks if the LTE frequencies received from the MSC 110 are available in the UE 100 and are available in the RAN. If the MSC LTE frequencies are available in both, the execution continues with step 370.

In step 370 the UE 100 uses the LTE frequencies from the MSC 110, so the re-selection of the RAN is based on preferences from the MSC 110. Then the flow stops.

If in step 360 the LTE frequencies received from the MSC 110 are not available in the UE 100 or are not available in the RAN, so the answer is no, the execution continues with step 380.

In step 380 the UE 100 uses one of the own supported LTE frequencies, so the re-selection of the RAN is based on UE 100 capabilities. Then the flow stops.

Figure 4:
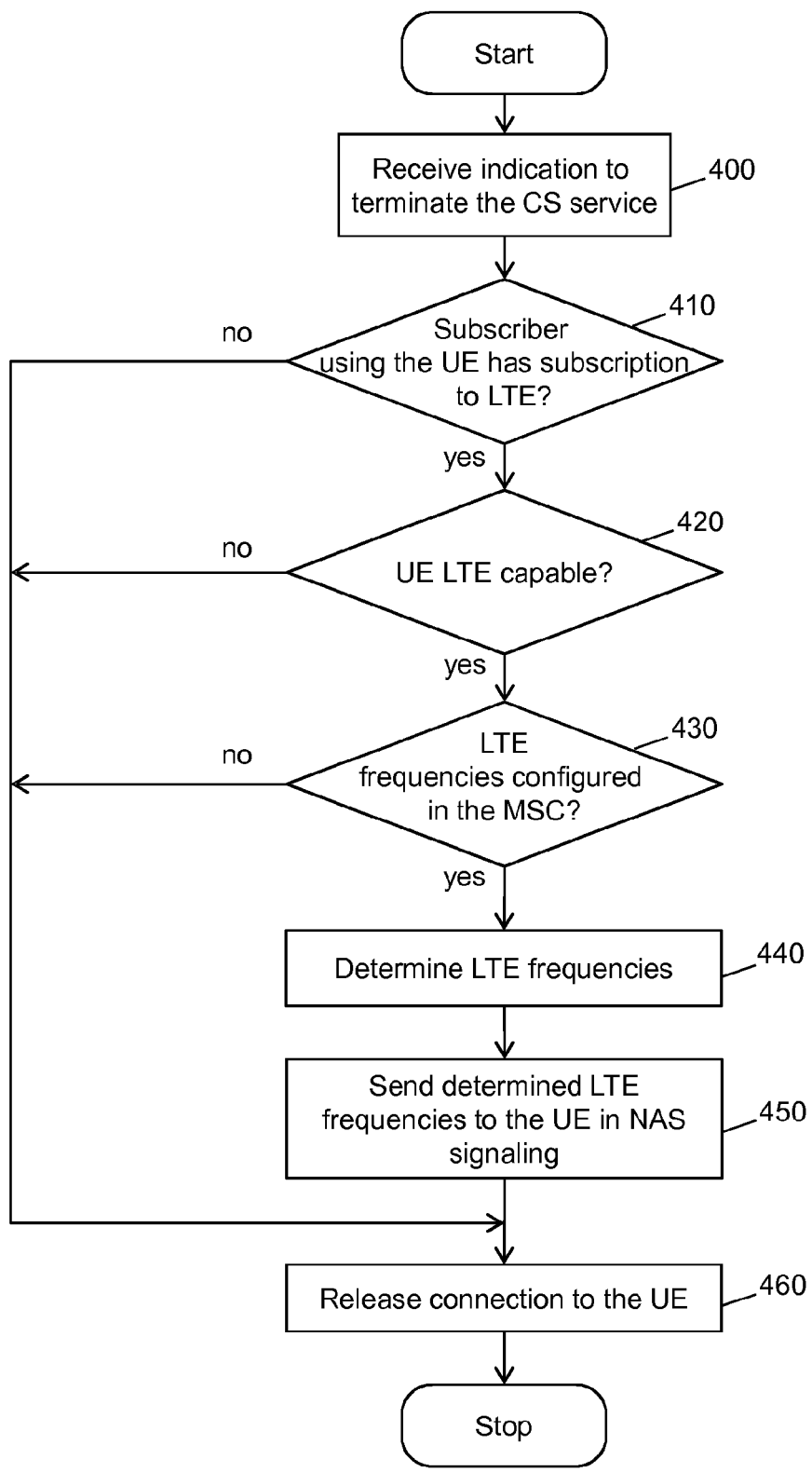
FIG. 4 shows a flow diagram in a CS control node for handling of re-selection of a RAN by a UE according to the invention.

Referring to FIG. 4, this figure shows a flow diagram in a CS control node 110 for handling of re-selection of a RAN by a UE 100 according to the invention.

The UE 100 is attached via a first RAN 120 or 130 to a MSC 110 for execution of a CS service, and execution of the CS service is ongoing. The MSC 110 may correspond to the CS control node 110.

The flow starts by the MSC 110 receiving 400 an indication to terminate the ongoing CS service. This indication by be received via NAS signaling from the UE 100, or the MSC 110 may receive this indication from a further node of the communication network.

In step 410 the MSC 110 checks if the subscriber using the UE 100 has a subscription to LTE. If the answer is yes, so the subscriber using the UE 100 has a subscription to LTE, the execution continues with step 420. If the answer is no, so subscriber using the UE 100 has no subscription to LTE, execution continues with step 460.

In step 420 the MSC 110 checks if the UE 100 is LTE capable. If the answer is yes, so the UE 100 is LTE capable, execution continues with step 430. If the answer is no, so the UE 100 is not LTE capable, execution continues with step 460.

In step 430 the MSC 110 checks if configured LTE frequencies are available in the MSC 110. If the answer is yes, so configured LTE frequencies are available in the MSC 110, execution continues with step 440. If the answer is no, so configured LTE frequencies are not available in the MSC 110, execution continues with step 460.

In step 440 the MSC 110 determines the LTE frequencies to be provided to the UE 100. The MSC 110 may determine the LTE frequencies in relation to whether the UE 100 is a roaming-in subscriber, so coming into the communication network from a further network. The MSC 110 may also or by alternative consider whether a fallback to the currently used RAN UTRAN 130 has been performed for the establishment of the ongoing CS service. The MSC 110 may also or by alternative consider whether a SRVCC handover has been performed before for the voice call, which then resulted into the ongoing CS service. A type of CS service or a geographical location of the UE 100 may also be considered by the MSC 110.

In step 450 the MSC 110 sends the determined LTE frequencies to the UE 100. The MSC 110 may utilize NAS signaling for the sending, wherein the signaling may be associated with the termination of the CS service.

In step 460 the MSC 110 releases the connection to the UE 100 and the CS service is terminated. Then the flow stops.

Figure 5:
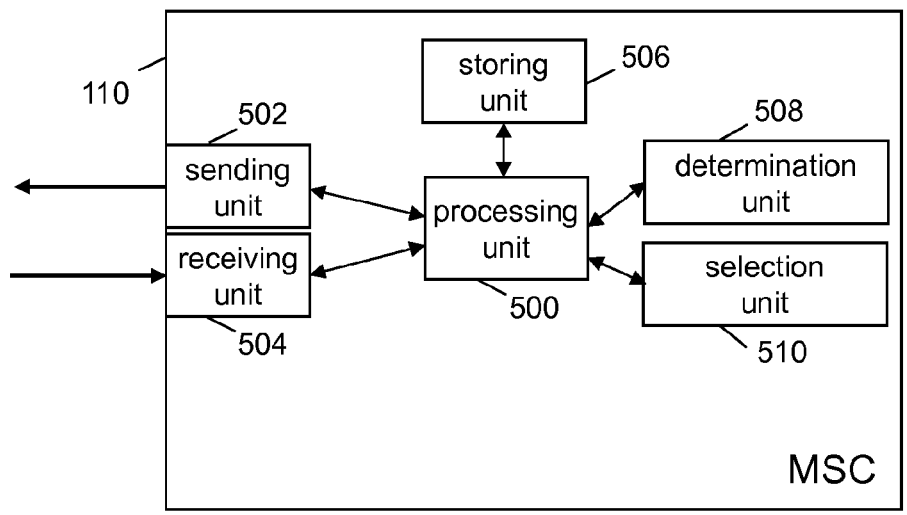
FIG. 5 shows a block diagram illustrating a CS control node for handling of re-selection of a RAN by a UE according to the invention.

Referring to FIG. 5, this figure shows a block diagram illustrating a CS control node for handling of re-selection of a RAN by a UE according to an embodiment. The illustrated entity may correspond to the MSC 110. The MSC 110 may be adapted to perform one or more steps of the above described method shown in FIG. 4.

The MSC 110 may comprise a number of functional units, which are described in further detail below and which are adapted to perform respective method steps.

A processing unit 500 of the MSC 110 may be adapted to receive an indication that the execution of the CS service shall be terminated. The processing unit 500 may be further adapted to determine whether the UE 100 shall perform re-selection of the RAN 120, 130, 140. The processing unit 500 may be further adapted to determine selection criteria for the re-selection of the RAN 120, 130, 140, if the UE 100 shall perform re-selection of the RAN 120, 130, 140. The processing unit 500 may also be adapted to send the selection criteria to the UE 100. In a practical implementation the processing unit 500 may be one processor taking care of all the above functions, or may also be distributed over more than one processor, wherein the functions are distributed over the available processors.

The MSC 110 may further comprise a sending unit 502 and a receiving unit 504 via which the MSC 110 can communicate with other entities of the communication network such as the UE 100 or further CS control nodes. The sending unit 502 may send out signaling messages composed by the processing unit 500. The receiving unit 504 may receive signaling messages originating from a UE 100, or from other entities of the communication network, or further CS control nodes, and forward the received signaling messages to the processing unit 500 for handling. The MSC 110 may comprise more than one sending unit and receiving unit for signaling capacity and redundancy reasons.

The MSC 110 may also comprise a storing unit 506 for storing information related to the handling of re-selection of a RAN by a UE. The storing unit 506 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 506 may be used by the processing unit 500 to store information, for example program code or RAN selection criteria.

The MSC 110 may also comprise a determination unit 508 for determining whether the UE 100 shall perform re-selection of the RAN 120, 130, 140. The MSC 110 may consider aspects such as whether a the subscriber using the UE 100 has a subscription to a LTE radio access, or whether the UE is supporting LTE radio access, or whether corresponding LTE frequencies are configured in the MSC 110.

The MSC 110 may also comprise a selection unit 510 for determining selection criteria for the re-selection of the RAN 120, 130, 140, if the UE 100 shall perform re-selection of the RAN 120, 130, 140. The MSC 110 may select certain LTE frequencies from the configured set of LTE frequencies in the MSC 110. The MSC 110 may determine the LTE frequencies in relation to whether the UE 100 is a roaming-in subscriber, so moving into the communication network from a further network. The MSC 110 may also consider whether a fallback to the currently used RAN has been performed for the establishment of the ongoing CS service. The MSC 110 may consider whether a SRVCC handover has been performed before for the voice call, which then resulted into the ongoing CS service. A type of CS service or a geographical location of the UE 100 may also be considered by the MSC 110.

Figure 6:
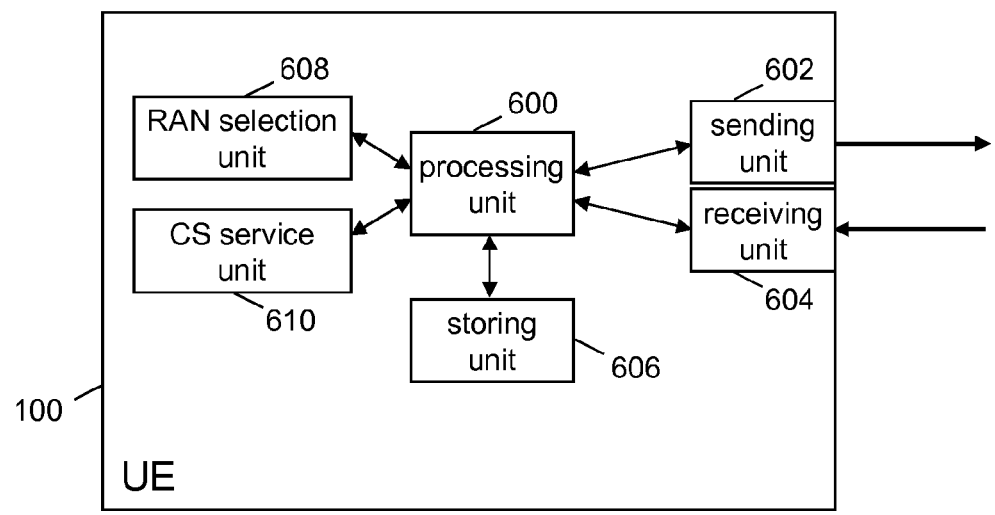
FIG. 6 shows a block diagram illustrating a UE for handling of re-selection of a RAN by a UE according to the invention.

Referring to FIG. 6, this figure shows a block diagram illustrating a UE for handling of re-selection of a RAN by a UE according to an embodiment. The illustrated entity may correspond to the UE 100. The UE 100 may be adapted to perform one or more steps of the above described method shown in FIG. 3.

The UE 100 may comprise a number of functional units, which are described in further detail below and which are adapted to perform respective method steps.

A processing unit 600 of the UE 100 may be adapted for re-selection of a radio access network, RAN 120, 130, 140. The processing unit 600 may be further adapted to receive an indication that the execution of the CS service shall be terminated. The processing unit 600 may be also adapted to receive selection criteria for the re-selection of the RAN 120, 130, 140. The processing unit 600 may be further adapted to re-select the RAN 120, 130, 140, wherein the re-selection is considering the received selection criteria. In a practical implementation the processing unit 600 may be one processor taking care of all the above functions, or may also be distributed over more than one processor, wherein the functions are distributed over the available processors.

The UE 100 may further comprise a sending unit 602 and a receiving unit 604 via which the UE 100 can communicate with other entities of the communication network such as the MSC 110. The sending unit 602 may send out signaling messages composed by the processing unit 600. The receiving unit 604 may receive signaling messages originating from other entities of the communication network such as the MSC 110 and forward the received signaling messages to the processing unit 600 for handling.

The UE 100 may also comprise a storing unit 606 for storing information related to the handling of re-selection of a RAN by a UE. The storing unit 606 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 606 may be used by the processing unit 600 to store information, for example received RAN selection criteria.

The UE 100 may also comprise a RAN selection unit 608 for re-selecting the RAN 120, 130, 140, after an ongoing CS services is terminated, wherein the re-selection is considering any received RAN selection criteria. The RAN selection criteria may be received from the storing unit 606 via the processing unit 600. RAN selection criteria may be a RAN frequency, a RAN technology, a RAN target cell, a RAN modulation, a RAN timeslot, a RAN multiplexing code, or any other RAN related parameter.

The UE 100 may also comprise a CS service unit 608 for execution of CS services. CS services may be a voice call, a short message, a location query, or an unstructured supplementary service, originating from the UE 100 or terminating at the UE 100. The CS service unit 608 may inform the processing unit 600 that a CS service execution is to be terminated.

According to another embodiment, a computer program is provided. The computer program may be executed by the processing units 500 and/or 600 of the above mentioned entities 100 and/or 110 respectively such that a method for handling of re-selection of a RAN by a UE as described above with reference to FIG. 3 or 4 may be carried out or be controlled. In particular, the entities 100 and/or 110 may be caused to operate in accordance with the above described method by executing the computer program.

The computer program may be embodied as computer code, for example of a computer program product. The computer program product may be stored on a computer readable medium, for example a disk or the storing unit 506 and/or 606 of the entities 100 and/or 110, or may be configured as downloadable information.

One or more embodiments as described above may enable at least one of the following technical effects:

Fast return to LTE RAN after a CS service has ended and thereby higher average data throughput for the subscriber No impact on RAN nodes, transparent RAN re-selection criteria delivery Less nodes to configure (only few MSCs compared to all RAN nodes) and thereby lower costs for the operator Not limited to certain UE hardware or RAN selection criteria MSC controlled RAN selection mechanism complementing a RAN based selection mechanism Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of operation by a Circuit Switched (CS) control node performed with respect to a UE that switched from a Packet Switched (PS) connection to a CS connection for execution of a CS service, the method comprising:
   determining that the UE is capable of connecting to a PS RAN that provides PS service coverage for a current geographic location of the UE; and
   in response to receiving an indication that the CS service shall be terminated:
      generating a message that indicates one or more radio parameters of the PS RAN, to assist the UE in reselecting from the CS RAN to the PS RAN upon termination of the CS service; and
      using Non-Access Stratum (NAS) signaling to send the message to the UE over the CS connection, such that the message passes transparently through a CS RAN that provides the CS connection.

2. The method of claim 1, wherein determining that the UE is capable of connecting to the PS RAN comprises receiving signaling indicating that the UE switched to the CS RAN for execution of the CS service, via a CS Fall-Back (CSFB) procedure or a Single Radio Voice Call Continuity (SRVCC) procedure.

3. The method of claim 1, wherein determining that the UE is capable of connecting to the PS RAN comprises accessing subscription information for the UE.

4. The method of claim 1, wherein receiving the indication that the CS service shall be terminated comprises receiving NAS signaling from the UE, indicating the termination.

5. The method of claim 1, wherein the one or more radio parameters comprises a frequency or frequencies used by the PS RAN.

6. A Circuit Switched (CS) control node comprising:
communication circuitry configured to communicate with a User Equipment (UE) via a CS Radio Access Network (RAN), the UE having switched from a Packet Switched (PS) connection to a CS connection for execution of a CS service; and
processing circuitry operatively associated with the communication circuitry and configured to:
determine that the UE is capable of connecting to a PS RAN that provides PS service coverage for a current geographic location of the UE; and
in response to receiving an indication that the CS service shall be terminated:
generate a message that indicates one or more radio parameters of the PS RAN, to assist the UE in reselecting from the CS RAN to the PS RAN upon termination of the CS service; and
use Non-Access Stratum (NAS) signaling to send the message to the UE over the CS connection, such that the message passes transparently through a CS RAN that provides the CS connection.

7. The CS control node of claim 6, wherein the processing circuitry is configured to determine that the UE is capable of connecting to the PS RAN based on the CS control node receiving signaling indicating that the UE switched to the CS RAN for execution of the CS service, via a CS Fall-Back (CSFB) procedure or a Single Radio Voice Call Continuity (SRVCC) procedure.

8. The CS control node of claim 6, wherein the processing circuitry is configured to determine that the UE is capable of connecting to the PS RAN, based on the CS control node accessing subscription information for the UE.

9. The CS control node of claim 6, wherein the processing circuitry is configured to receive NAS signaling from the UE, indicating the termination.

10. The CS control node of claim 6, wherein the one or more radio parameters comprises a frequency or frequencies used by the PS RAN.

11. A method performed by a User Equipment (UE), the method comprising:
executing a Circuit Switched (CS) service via a CS connection to a CS Radio Access Network (RAN);
receiving Non-Access Stratum (NAS) signaling from a CS control node associated with the CS RAN, the NAS signaling carried transparently through the CS RAN over the CS connection and comprising a message that indicates one or more radio parameters of a Packet Switched (PS) RAN; and
upon termination of the CS service, reselecting from the CS RAN to the PS RAN, using the one or more radio parameters to assist the reselecting.

12. The method of claim 11, wherein the method further comprises, for execution of the CS service, switching from a PS connection to the CS connection.

13. The method of claim 12, wherein switching from the PS connection to the CS connection comprises switching via a CS Fall-Back (CSFB) procedure or a Single Radio Voice Call Continuity (SRVCC) procedure.

14. The method of claim 11, wherein the method further comprises sending NAS signaling to the CS control node, via the CS connection, the NAS signaling sent from the UE including an indication that the CS service shall be terminated, and wherein the NAS signaling received from the CS control node is sent by the CS control node in response to the CS control node receiving the indication that the CS service shall be terminated.

15. The method of claim 11, wherein the one or more radio parameters comprise a frequency or frequencies used by the PS RAN, and wherein reselecting from the CS RAN to the PS RAN comprises using one frequency or frequencies to search for network access signals transmitted for the PS RAN.

16. A User Equipment (UE) comprising:
communication circuitry configured for connecting to Packet Switched (PS) and Circuit Switched (CS) Radio Access Networks (RANs); and
processing circuitry operatively associated with the communication circuitry and configured to:
execute a CS service via a CS connection to a CS RAN;
receive Non-Access Stratum (NAS) signaling from a CS control node associated with the CS RAN, the NAS signaling carried transparently through the CS RAN over the CS connection and comprising a message that indicates one or more radio parameters of a PS RAN; and
upon termination of the CS service, reselect from the CS RAN to the PS RAN, using the one or more radio parameters to assist the reselecting.

17. The UE of claim 16, wherein the processing circuitry is configured to switch from a PS connection to the CS connection, for execution of the CS service.

18. The UE of claim 17, wherein the processing circuitry is configured to switch from the PS connection to the CS connection by performing a CS Fall-Back (CSFB) procedure or a Single Radio Voice Call Continuity (SRVCC) procedure.

19. The UE of claim 16, wherein the processing circuitry is configured to send NAS signaling to the CS control node, via the CS connection, the NAS signaling sent from the UE including an indication that the CS service shall be terminated, and wherein the NAS signaling received from the CS control node is sent by the CS control node in response to the CS control node receiving the indication that the CS service shall be terminated.

20. The method of claim 16, wherein the one or more radio parameters comprise a frequency or frequencies used by the PS RAN, and wherein the processing circuitry is configured to reselect from the CS RAN to the PS RAN by using one frequency or frequencies to search for network access signals transmitted for the PS RAN.

* * * * *